July 1, 1930.                H. D. ELSE                1,768,897
                    INDUCTION MOTOR CONTROL SYSTEM
                        Filed Sept. 11, 1929
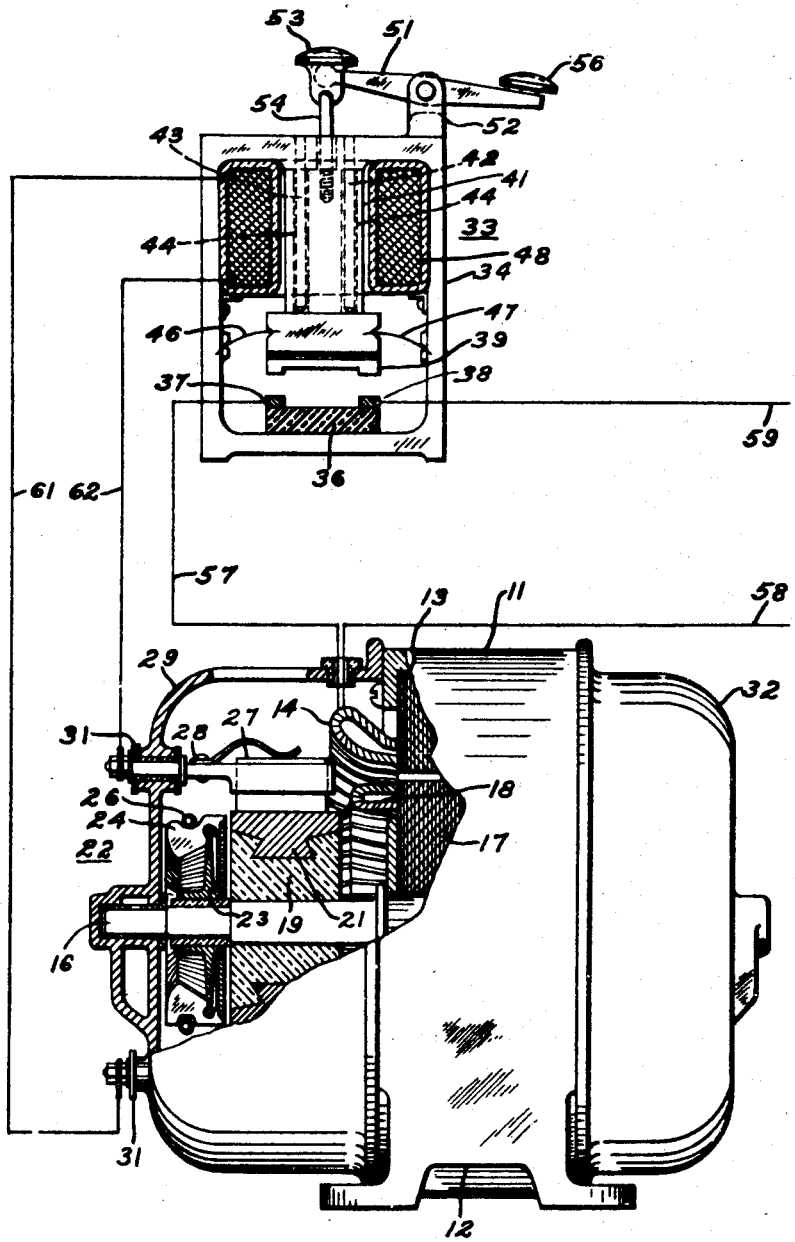
INVENTOR
Harry D. Else
BY
Charles E. Carr
ATTORNEY.

UNITED STATES PATENT OFFICE

HARRY D. ELSE, OF SPRINGFIELD, MASSACHUSETTS, ASSIGNOR TO WESTINGHOUSE ELECTRIC & MANUFACTURING COMPANY, A CORPORATION OF PENNSYLVANIA

INDUCTION-MOTOR-CONTROL SYSTEM

Application filed September 11, 1929. Serial No. 391,736.

My invention relates to alternating-current motors and, more particularly, to repulsion-induction motors.

An object of my invention is to provide a relatively simple means for permitting the starting of a repulsion-induction motor and of effectively protecting the same against excessive overloads.

In practicing my invention, I provide, in combination with a repulsion-induction motor having a stator-energizing winding, a rotor core, a rotor winding and a commutator cylinder, a centrifugally-actuable commutator-short-circuiting device and brushes, and an electro-magnetic switch, including a movable core member, an actuating coil for moving the core member and the switch to its open position and manually actuable means for closing or for opening the switch.

The single figure of the drawing shows a motor of the repulsion-induction type partially in side elevation and partially in section to show the inner parts thereof, and an electro-magnetic switch comprising my invention also partially in side elevation and partially in section.

A repulsion-induction motor 11 comprises the usual housing 12, a laminated stator 13 and a stator energizing winding 14. A rotor shaft 16 has the usual laminated rotor core 17 and a rotor winding 18 mounted thereon. A commutator cylinder, comprising a hub 19 and segments 21, is also provided, the segments being electrically connected to the terminals of the several coils 18, all in a manner well known in the art.

A centrifugally-actuable commutator-short-circuiting device 22 is provided and, while a specific construction thereof is shown in the drawings as embodying an annular member 23 mounted on the shaft, a plurality of weight members 24 pivotally mounted thereon and a garter spring 26 for yieldingly holding the weight members in positions to be disengaged from the front or end faces of the commutator segments 21, I do not desire to be limited thereto, as any effective short-circuiting device may be employed.

A plurality of brushes 27 and brushholders 28 are supported by an end bracket 29 of the motor and insulated therefrom by bushings 31 of an electric insulating material.

A second end bell 32 is provided for the other end of the motor stator housing, and suitable bearings are provided in the respective end bells to support the shaft and the rotor, all in a manner well known in the art. While I have illustrated and described a specific embodiment of motor structure, commutator, commutator short circuiting device, brushholders and brushholder mountings, these have been shown and described for illustrative purposes only and any structures equivalent to those shown in the drawings may be employed.

An electro-magnetically actuated switch, designated generally by the numeral 33, may comprise a skeleton frame member 34 of substantially rectangular shape. A block 36 of electric insulating material may be located at the bottom portion of the frame 34 and have mounted thereon, in any suitable manner, contact members 37 and 38.

A cooperating contact bridging member 39 is insulatedly mounted on a movable magnetizable core member 41 and particularly at the lower end thereof. Each of the guide rods 42 and 43 may have one end fixedly mounted in the upper part of the frame 34 and may extend downwardly therefrom and into suitable longitudinally extending openings 44 in the core member 41.

It is desired that the bridging member 39 shall have two limiting positions only and that it shall move from the one to the other of these positions with a snap action, and, for this purpose, two resilient arms 46 and 47 are provided which extend between the lower portion of the core member 41 and the inside surfaces of the vertically extending portions of the frame 34, in substantially the manner and location shown in the drawing. The arms 46 and 47 constitute a toggle and will maintain the bridging member 39 and the core 41 in either one of their limiting positions in which the bridging member 39 is in engagement with the contact members 37 and 38 or is disengaged therefrom.

A coil 48 is provided for actuating the core member 41 in such direction as to cause opening movement of the switch, the coil being suitably so supported within the frame 34 as to be fixed relatively thereto.

Manually actuable means for moving the core member 41 and the bridging member 39 may include a lever 51 pivotally mounted on an extension 52 of the frame 34, a knob 53 and a rod 54 pivotally mounted at one end of the lever 51, the lower end of the rod 54 being secured to the core member 41. A second knob 56 is mounted in the other end of the lever 51. Pressure on the knob 53 causes movement of the core 41 and the bridging member 39 to close the circuit controlled thereby, and pressure on the knob 56 causes movement of the core and bridging member in the other direction to open the switch.

The contact member 37 is connected, by a conductor 57, to one terminal of the stator-energizing winding 14, while the other terminal thereof is connected to a supply-circuit conductor 58. A second supply-circuit conductor 59 is electrically connected to contact member 38.

The terminals of coil 48 are so connected, by conductors 61 and 62, to the brushholders 28 of respectively opposite polarities that the coil 48 may be energized by the electro-motive forces generated in the rotor winding 18 so long as the commutator and the rotor winding are not short circuited by the short-circuiting device 22.

The operation of the device and system embodying my invention may be briefly described as follows: As is well known, a repulsion-induction motor will start as a repulsion motor when the circuit through the stator-energizing winding is closed by means of a suitable switch. At starting and up to a predetermined speed, the short-circuiting device 22 will be out of engagement with the commutator. An operator, pressing on the knob 53, will close the circuit with a snap action and will maintain the pressure required to hold the switch closed against the decreasing pull of the coil 48 as it is energized from the rotor winding 18 in accordance with the increasing speed of the rotor. At a predetermined speed, the centrifugally actuable short-circuiting means is operated to short circuit the winding and, therefore, no current will traverse the coil 48. When the motor comes up to its normal operating speed, pressure on the knob 53 may be released.

The motor will now operate at speeds in accordance with the load and the design constants of the motor. If extreme overload conditions occur which so reduce the speed of the motor as to cause it to drop out of step which, as is well known, will occur after the maximum pull-out torque is exceeded, the commutator short-circuiting device will be operated to remove the short circuit from the commutator and rotor winding, the coil 48 will be energized and will cause movement of the core 41 whereby the switch controlling the stator-energizing winding is opened and the stator winding is deenergized to shut down of the motor.

In case the line circuit of the motor is momentarily deenergized after the motor has been operating, the switch 33 will initially remain in its closed position. As soon as the line is again energized, the initial rush of current through the motor-energizing winding (assuming the rotor to be stationary) will be relatively large and will effect opening of the switch, thereby preventing re-operation of the motor. Such an operating feature is very desirable on manually operable switches used for this purpose.

If an operator should desire to manually operate the switch to open the circuit, he need only press on the knob 56, and the toggle joint members will insure quick and complete opening of the control switch.

Various modifications may be made in the device and system embodying my invention without departing from the spirit and scope thereof, and I desire, therefore, that only such limitations shall be placed thereon as are imposed by the prior art or are set forth in the appended claims.

I claim as my invention:

1. A control system for a repulsion-induction motor having a stator-energizing winding, a rotor, a rotor winding, a commutator cylinder and brushes, and a centrifugally-actuable commutator-short-circuiting device, said system including an electromagnetic switch for the stator-energizing winding, means for connecting the coil of said switch to said brushes and manually-actuable means for closing said switch.

2. A control system for a repulsion-induction motor having a stator-energizing winding, a rotor, a rotor winding, a commutator cylinder and brushes, and a centrifugally-actuable commutator-short-circuiting device, said system including a switch for the stator-energizing winding, a movable magnetizable core member for the switch, an actuating coil for the core, means for connecting the coil to the brushes, resilient means for yieldingly holding the core and switch in either one of two limiting positions and manually-actuable means for closing said switch.

3. A control system for a repulsion-induction motor having a stator-energizing winding, a rotor, a rotor winding, a commutator cylinder and brushes, and a centrifugally-actuable commutator-short-circuiting device, said system including a switch for the stator winding, a magnetizable core member for the switch, a coil for moving the core to effect opening of the switch, means for electrically connecting the coil to the brushes to be energized by the rotor winding under predetermined operating conditions and manually-actuable means for moving said core to close said switch.

4. A control system for a repulsion-induction motor having a stator-energizing winding, a rotor, a rotor winding, a commutator cylinder and brushes, and a centrifugally-actuable commutator-short-circuiting device, said system including a switch for the stator winding, a magnetizable core for the switch, means operatively associated with said core and switch to cause movement thereof to be effected with a snap action, a coil for moving the core to effect opening of the switch, means for connecting the coil to the brushes to be energized by the rotor winding under predetermined operating conditions and manually-operable means for moving the core to close and to open said switch.

5. Means for deenergizing a repulsion-induction motor having a stator-energizing winding, a rotor, a rotor winding, a commutator cylinder, brushes and a centrifugally-actuable commutator-short-circuiting device, said means including an electromagnetic switch having an actuating coil and means for electrically connecting it to the brushes, said coil being effective to cause opening movement of the switch upon disengagement of the centrifugally-actuable short-circuiting device from the commutator.

In testimony whereof, I have hereunto subscribed my name this 27th day of August, 1929.

HARRY D. ELSE.